US010025693B2

(12) United States Patent
Schulze

(10) Patent No.: US 10,025,693 B2
(45) Date of Patent: Jul. 17, 2018

(54) PSEUDO HARDWARE WATCH POINTS FOR REMOTE DEBUGGING OF NON-INITIALIZED PROCESSORS

(75) Inventor: Joerg Schulze, Leonberg (DE)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 13/285,101

(22) Filed: Oct. 31, 2011

(65) Prior Publication Data

US 2013/0111452 A1 May 2, 2013

(51) Int. Cl.
*G06F 19/00* (2018.01)
*G06F 11/36* (2006.01)

(52) U.S. Cl.
CPC ...... *G06F 11/3636* (2013.01); *G06F 11/3648* (2013.01); *G06F 11/3656* (2013.01); *G06F 11/362* (2013.01)

(58) Field of Classification Search
USPC .......... 714/2; 703/28; 712/34; 710/260, 264; 326/41
IPC .............. G06F 11/3656,11/3636, 13/24, 13/26, 13/13, 21/85, 9/3889
See application file for complete search history.

(56) References Cited

U.S. PATENT DOCUMENTS

| | | | | |
|---|---|---|---|---|
| 4,257,101 A * | 3/1981 | Holtey et al. | ...................... | 714/2 |
| 5,321,828 A * | 6/1994 | Phillips et al. | .................. | 703/28 |
| 5,371,878 A * | 12/1994 | Coker | .............................. | 703/28 |
| 5,684,997 A * | 11/1997 | Kau et al. | ...................... | 710/260 |
| 7,428,727 B2 | 9/2008 | Alverson et al. | | |
| 7,506,313 B2 | 3/2009 | Bates et al. | | |
| 7,774,761 B2 | 8/2010 | Vohra | | |
| 7,823,019 B2 | 10/2010 | Piry et al. | | |
| 8,230,149 B1 * | 7/2012 | Long et al. | ................... | 710/305 |
| 8,319,521 B1 * | 11/2012 | Han et al. | ........................ | 326/41 |
| 2001/0032305 A1 * | 10/2001 | Barry | .............................. | 712/34 |
| 2001/0049763 A1 * | 12/2001 | Barry et al. | .................. | 710/264 |
| 2007/0168994 A1 | 7/2007 | Barsness et al. | | |
| 2008/0295077 A1 | 11/2008 | Sengupta et al. | | |

OTHER PUBLICATIONS

C. Chou Wen, C. Chen and T. Chen; "A Non-Uniform Debugging Architecture and Non-Intrusive Race Detection for Many-Core Systems"; IEEE Transactions on Computers; vol. PP, Issue 99; p. 1 (Abstract).

\* cited by examiner

*Primary Examiner* — Tuan Vu
(74) *Attorney, Agent, or Firm* — VanLeeuwen & VanLeeuwen; William J. Stock

(57) ABSTRACT

A hardware access layer (HAL) is combined with a configurable shadow mechanism, that copies the specified memory or register segments accessed in remote hardware by a program being debugged. The HAL may be involved in all interrupt handling for the remote hardware. By making this shadow mechanism configurable during runtime, and using a standard debugging techniques, a developer can specify watchpoints to break program execution based on changes in the remotely attached hardware as indicated in the specified shadow register segments.

22 Claims, 5 Drawing Sheets

PSEUDO HARDWARE WATCH POINTS FOR REMOTE DEBUGGING OF NON-INITIALIZED PROCESSORS

BACKGROUND

Technical Field

Various embodiments disclosed herein relate to programmable electronics, and more specifically, to computers and to computer programs.

Description of Related Art

A breakpoint is a location in programming code that, upon being reached, triggers a temporary halt in the program. Programmers use breakpoints to test and debug programs by causing the program to stop at scheduled intervals so that the status of the program can be examined in stages. Memory break points can be helpful tools to debug program control flow. However, the present inventor recognized certain drawbacks of conventional memory breakpoints as debugging tools.

BRIEF SUMMARY

The present inventor recognized that conventional memory breakpoints cannot be used in debugging program control flow for a remote processor which does not execute the program, but gets manipulated, initialized, or changed by the program, for example, to debug. Conventional breakpoints can be used on code that runs on a local processor. However, if the code running on the local processor initializes a remote processor, then conventional breakpoints cannot be used for changes in the memory or registers of the remote chip.

Various embodiments disclosed herein involve initiating a break in the program code running in process space of a local processor. The program code to be analyzed is selected, and it is determined which remote hardware memory segments are accessed by the selected program code. A shadow mechanism is set up having shadow segments corresponding to the remote hardware memory segments that are accessed by the selected program code. One or more break events are defined which control whether or not the program code is halted. Once the program code is running, if the occurrence of a break event is indicated in one or more of the shadow segments the execution of the program code is halted.

BRIEF DESCRIPTION OF THE DRAWINGS

The accompanying drawings, which are incorporated in and constitute part of the specification, illustrate the various embodiments. Together with the general description, the drawings serve to explain the principles of the various embodiments. In the drawings.

DETAILED DESCRIPTION

Figure 1:
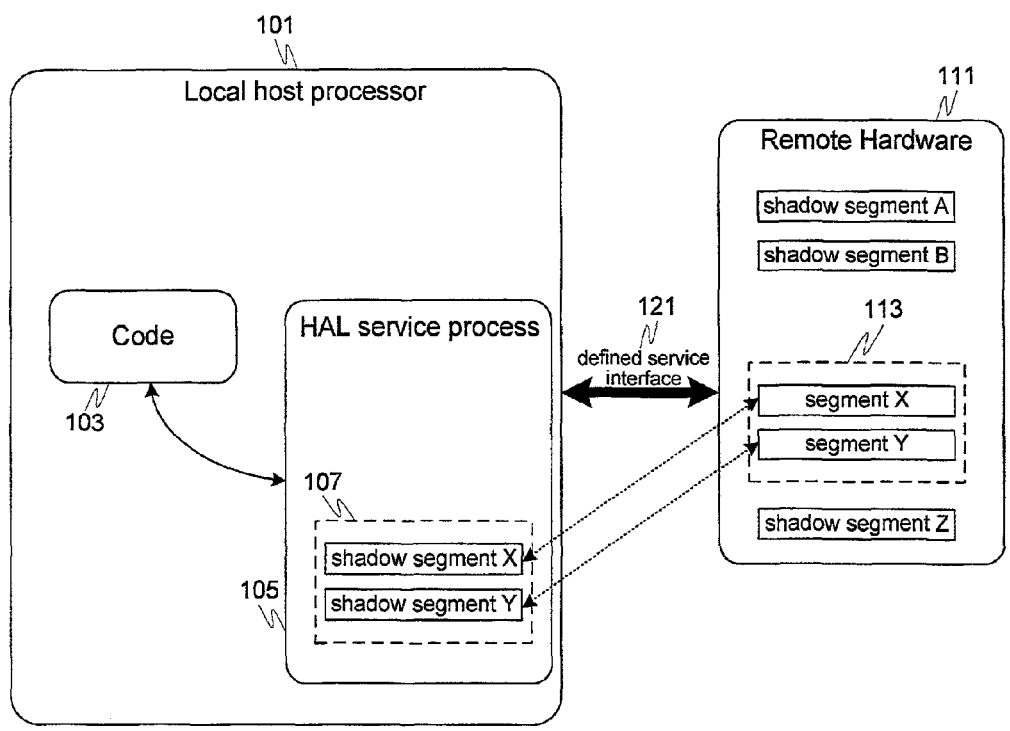
FIG. 1 depicts an example of a hardware configuration suitable for implementing various embodiments disclosed herein.

FIG. 1 depicts an example of a hardware configuration suitable for implementing various embodiments. In FIG. 1 the local processor 101 (or host system) is a processor or other information processing device suitable for executing or otherwise running code to be debugged. FIG. 1 depicts local processor 101 executing code 103 that is to be debugged. The code 103 is code that initializes remote hardware, for example, remote hardware 111. This poses a problem for convention debugging breakpoints since code running on a local processor that initializes a remote processor cannot use conventional memory breakpoints for the memory or registers of the remote processor. Various embodiments disclosed herein overcome this drawback.

In accordance with various embodiments the local processor 101 is configured to execute a hardware access layer (HAL) 105 that provides access to the remote hardware 111 via defined service interface 121. The code 103 to be debugged uses HAL 105 to access the remote hardware 111 via the defined service interface 121. For the purposes of this disclosure the local processor 101 is referred to as "local" since the code 103 to be debugged executes on it. The remote hardware 111 is referred to as "remote" since the code 103 to be debugged is running on local processor 101 and accesses remote hardware 111 via an interface. The remote hardware 111, in various embodiments, is accessible via the defined service interface 121, and has interrupt capability. In other embodiments the hardware 111 may not have interrupt capability.

The local processor 101 is provided with a configurable shadow mechanism 107 that copies specified memory or registry segments of the remote hardware 111. The shadow mechanism 107 copies the specified memory or register segments 113 from the remote hardware 111 into the process space of the local processor 101 on which the access layer HAL 105 is executed. In accordance with at least some embodiments the HAL 105 may be involved in the interrupt handling for the remote hardware 111.

In various embodiments, the shadow mechanism 107 is configurable during runtime. This affords a developer using standard debugging techniques the flexibility to be able to specify watchpoints to break program execution based on changes in the remote hardware 111. In another embodiment the shadow mechanism 107 may be predefined or configured before runtime.

Figure 2:
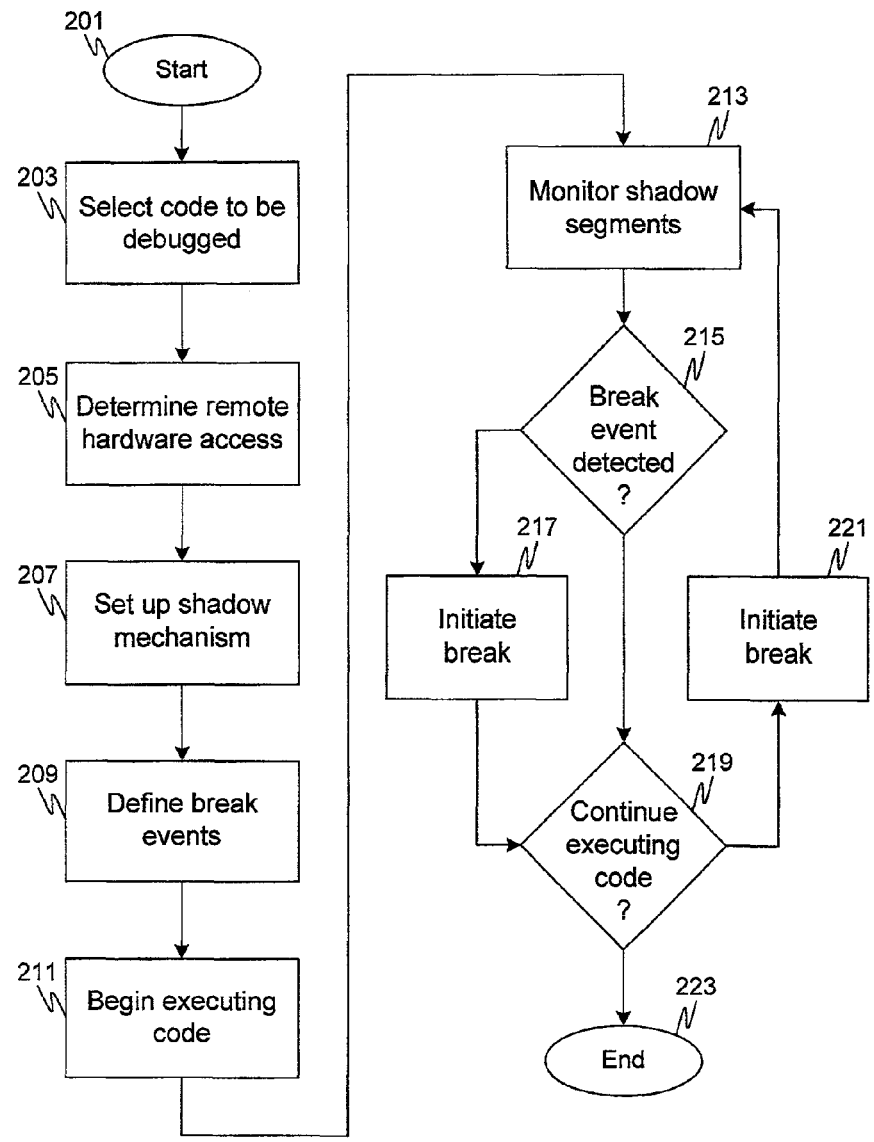
FIG. 2 is a flowchart depicting use of code execution break according to various embodiments disclosed herein.

In some embodiments the HAL 105 may be involved in all interrupt handling for the remote hardware. By making this shadow mechanism configurable during runtime and using a standard debugging techniques, a developer can specify watchpoints to break the program execution based on changes in the remotely attached hardware. In various embodiments the remotely attached hardware fulfills requirements of: 1) being accessible via a defined service interface; and 2) having interrupt capability. FIG. 2 is a flowchart depicting use of code execution break according to various embodiments. The method begins at 201 and proceeds to block 203 where code for the selection of code to be debugged, for example, code 103 of FIG. 1. The code may be a software program, code, instructions, or one or more modules or subroutines. The selected code be a whole program, subroutine or the like, or may be a selected portion of the program or subroutine. Once the code to be debugged is selected in 203 the method proceeds to 205.

Block 205 involves the determination of the remote hardware that the selected code will access, for example remote hardware 111 of FIG. 1. This may be done by examining the code itself, by searching for certain commands or statements within the code, or by reviewing calls or access to the defined service interface 121. One additional source to identify hardware segments of interest is the hardware specification documentation. For example, it is a common scenario to be interested in status changes. Most processors have at one or more status registers, which would be described in the processor documentation. Part of the determination involves developing a list of hardware segments, (including memory segments, registers or other units of memory) that will be accessed by the code or otherwise watched for changes to break code execution. For example, one valid scenario would be to configure the system to break the program that only access registers A and B whenever register C changes (e.g., maybe because register A was altered). Once the remote hardware to be accessed has been determined in block 205 the method proceeds to 207.

In block 207 a shadow mechanism is set up in the process space of the local processor, e.g., processor 101. The shadow mechanism copies specified memory segments of the remote processor that are to be accessed by the code being debugged. Some embodiments allow on-the-fly adjustment of the list of hardware segments to watch at runtime. This feature may depend upon the implementation of the service layer. Any race conditions caused by adjusting the shadow mechanism at runtime of the program are typically handled in the service layer itself. The shadow mechanism will maintain a corresponding shadow memory segment for each memory segment of the remote processor accessed by the code under evaluation. This can be seen in FIG. 1 which depicts a corresponding shadow segment in 107 for each segment 113 to be accessed in the remote hardware 111. Once the shadow mechanism has been set up the method proceeds to block 209.

Figure 3A:
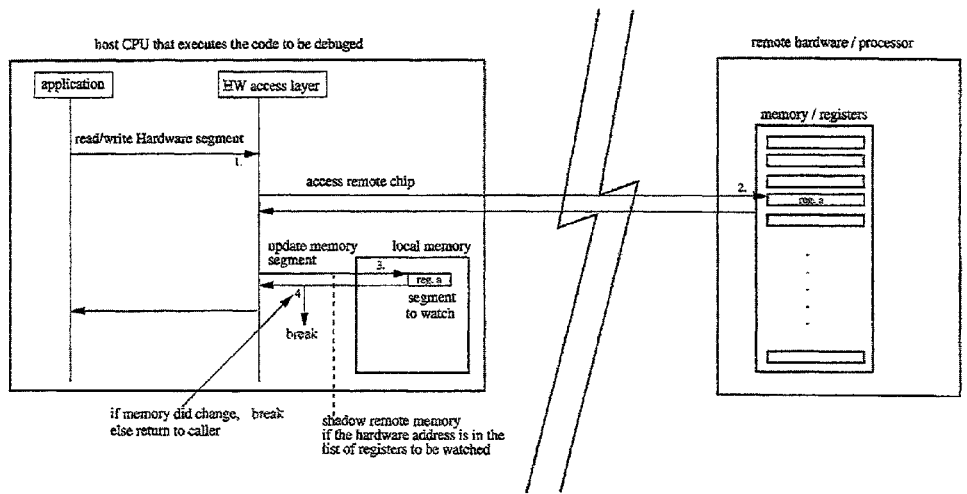
FIGS. 3A-C depicts three scenarios arising in a code execution break.
Figure 3B:
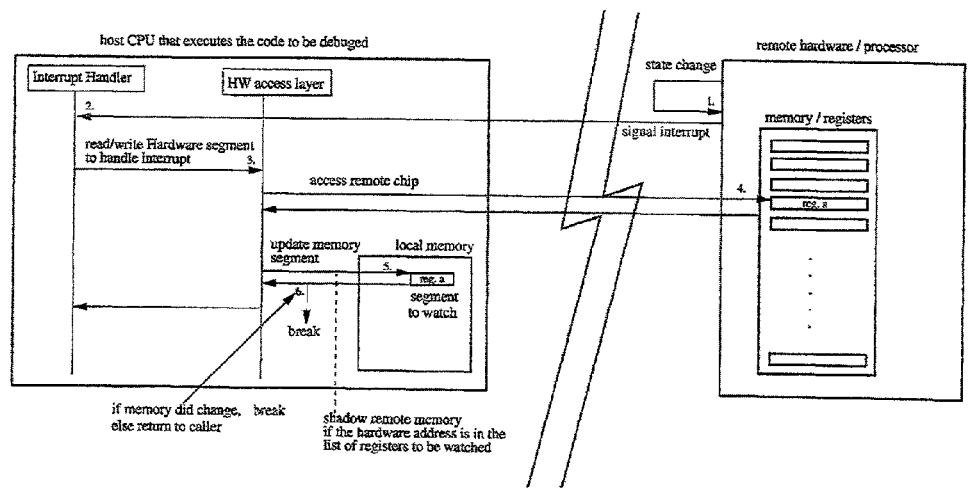
Figure 3C:
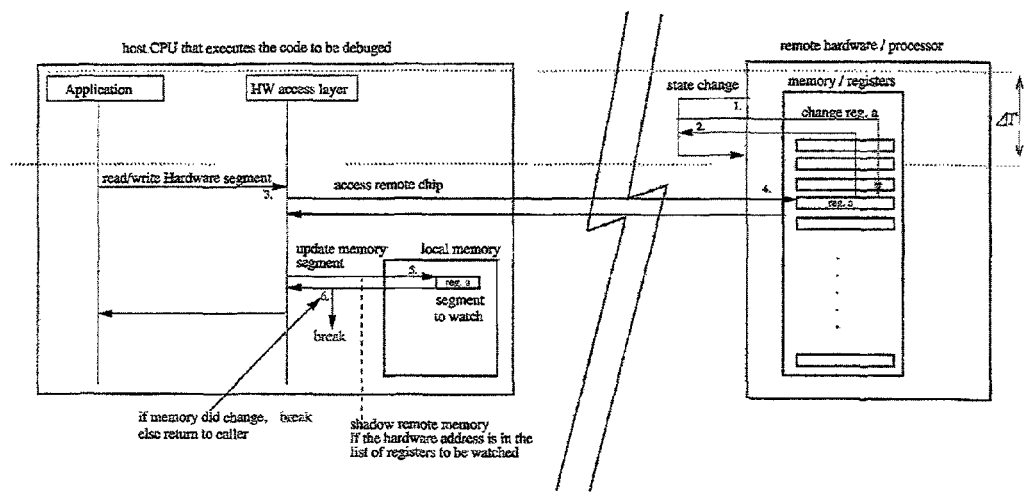

Block 209 involves defining the pseudo hardware watch points, or break events, that will result in a breakpoint. The break events need not be a failure, overflow or other disruption in the code execution. The programmer may simply want the execution to stop at a certain point in order to determine the state of the code at that point. A break event may be any event or condition of interest to the programmer, that is, where the programmer wants to stop execution of the program. The break event could be defined as a given one of the registers or other memory units being accessed a predefined number of times or in a predefined order, a variable reaching a certain value, a threshold being met or exceeded (up or down), the point when a predefined combination of registers or memory units being has been accessed (e.g., when all the memory units, or select ones of the memory units, have been accessed), or any other condition or state of the hardware or software, or like event of interest to the programmer. The break event can be defined in block 209 as any change in the remote hardware detectable by observing or otherwise tracking the shadow segments set up in the local processor space. Block 209 may entail setting up multiple break events. FIGS. 3A-C and the disclosure pertaining to these figures describe three scenarios where a break event gives rise to a breakpoint halting the execution of the code.

In block 211 execution of the code to be debugged or otherwise evaluated is initiated. Once the code execution has begun the method proceeds to block 213 to monitor the shadow hardware for the occurrence of a break event. The method then proceeds to 215 to determine whether any break event has been detected. If a break event is detected the method proceeds from 215 along the "YES" path to 217 to initiate a breakpoint and suspend execution of the code. Once the code is halted the programmer may observe the state of the code or make any desired alterations or changes before resuming execution. The programmer may make alterations to the code itself, may add or delete break events, or may add or eliminate shadow memory segments. Once the programmer has finished any observations or changes in block 217, the method proceeds to 219 to determine whether continue executing the code. If the programmer opts to continue executing the code the method proceeds from 219 along the "YES" path to block 221 to resume code execution. The method then proceeds to 213 to continue monitoring the shadow memory units for break events.

Returning to block 215, it may be the case that a timeout function has been reached (or a certain number of code execution cycles or iterations reached) without detecting a break event. In such situations the method proceeds from block 215 along the "NO" path to 219 where the programmer is given the option of continuing with execution or ending the code execution. If the programmer opts to end code execution the method proceeds from 219 along the "NO" path to block 223 where the method ends.

FIGS. 3A-C depicts three scenarios arising in a code execution break. Turning to FIG. 3A, this figure depicts a scenario which an application caused a hardware change in a watched shadowed segment of the remote hardware leads to a break in the hardware access. In the FIG. 3A scenario the program execution gets interrupted to allow debugging due to a change in the remote hardware caused by the code itself. This could be a direct change of the hardware segment to watch or a change caused by a code driven hardware change, like changing a command register, which triggers a change in a status register. Debugging of applications, which run in parallel is also possible, by running a hardware access layer, under debug control and ensure, that all hardware access are synchronized. In this case the execution of all hardware accesses would be stopped and it would be possible to investigate the state of all applications that try to access the hardware.

FIG. 3B depicts the scenario which provides a break in program execution if the hardware state changes by a remote hardware intrinsic action with an interrupt. In this scenario the program execution gets interrupted to allow debugging due to an intrinsic change in the remote hard ware, which caused the hardware to trigger an interrupt. This interrupt gets handled by a component that is registered for these interrupts and does access the remote hardware to read the current status, which would cause a change in the watched memory segment of the instrumented hardware access layer and break the execution of the interrupt handling code. Like the scenario of FIG. 3A it would be possible to let the hardware access layer code run under debugger control to allow investigation of all applications that try to access the remote hardware and run in parallel.

FIG. 3C depicts the scenario which provides a break in the program if hardware state changes by remote hardware intrinsic action without interrupt. In this scenario the hardware state changes, but the state change is no direct result of code interaction and does not trigger an interrupt. FIG. 3C shows how a state change happens in the remote hardware in the time interval DT. During DT there is no hardware access by code. After that time the next hardware access causes a change in the shadow of that remote hardware segment, which breaks the program execution.

Figure 4:
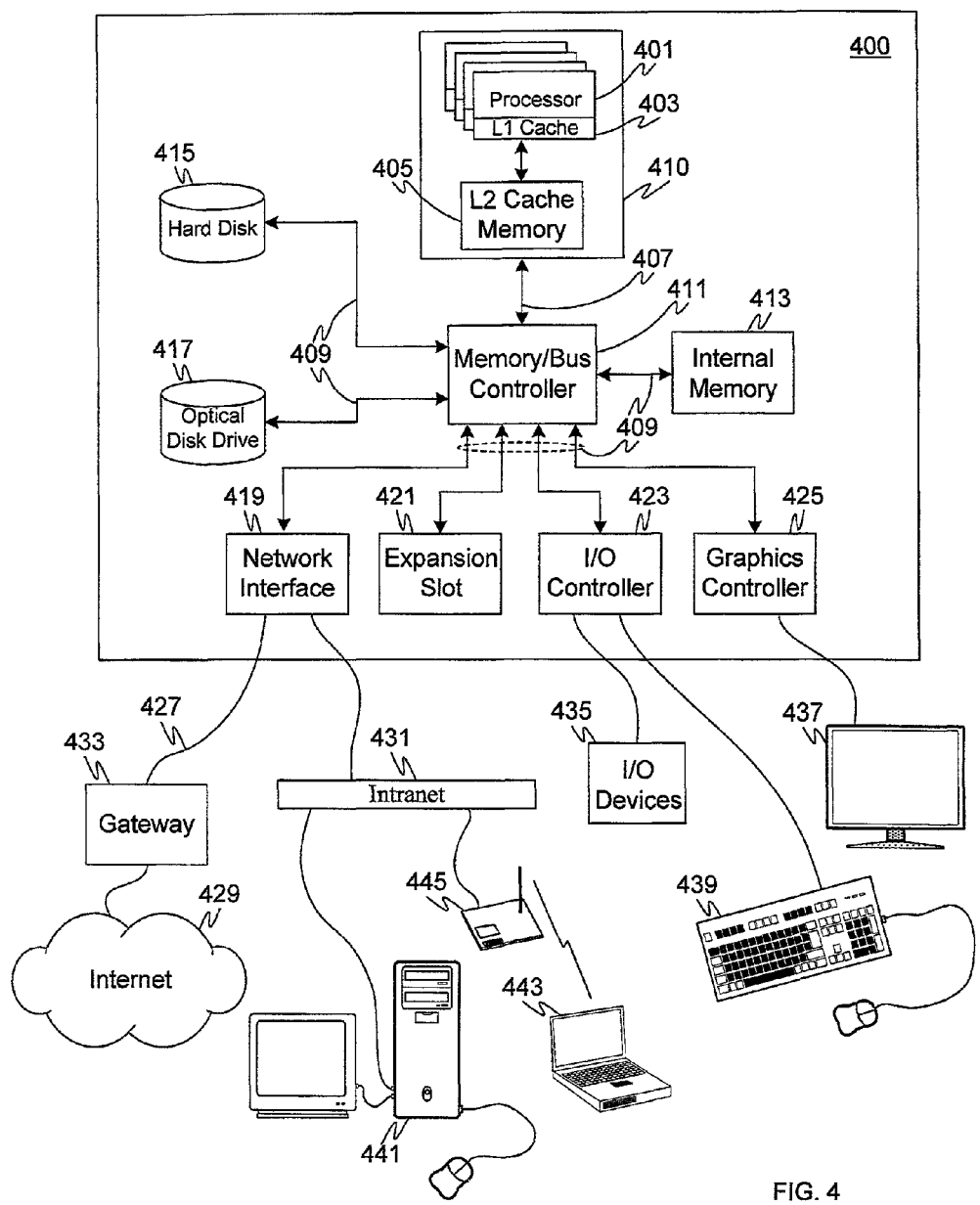
FIG. 4 depicts typical computer hardware suitable for implementing various embodiments disclosed herein.

FIG. 4 depicts a computer system 400 and components suitable for implementing the various embodiments disclosed herein. The computer system 400 may be configured in the form of a desktop computer, a laptop computer, a mainframe computer, or any other hardware or logic arrangement capable of being programmed or configured to carry out instructions. In some embodiments the computer system 400 may act as a server, accepting inputs from a remote user over a local area network (LAN) 427, the Internet 429, or an intranet 431. In other embodiments, the computer system 400 may function as a smart user interface device for a server on the LAN 427 or over the Internet 429. The computer system 400 may be located and interconnected in one location, or may be distributed in various locations and interconnected via communication links such as a LAN 427 or a wide area network (WAN), via the Internet 429, via the public switched telephone network (PSTN), a switching network, a cellular telephone network, a wireless link, or other such communication links. Other devices may also be suitable for implementing or practicing the embodiments, or a portion of the embodiments. Such devices include personal digital assistants (PDA), wireless handsets (e.g., a cellular telephone or pager), and other such electronic devices preferably capable of being programmed to carry out instructions or routines. Those of ordinary skill in the art may recognize that many different architectures may be suitable for the computer system 400, although only one typical architecture is depicted in FIG. 4.

Computer system 400 may include a processor 401 which may be embodied as a microprocessor, two or more parallel processors as shown in FIG. 4, a central processing unit (CPU) or other such control logic or circuitry. The processor 401 may be configured to access a local cache memory 403, and send requests for data that are not found in the local cache memory 403 across a cache bus to a second level cache memory 405. Some embodiments may integrate the processor 401, and the local cache 403 onto a single integrated circuit and other embodiments may utilize a single level cache memory or no cache memory at all. Other embodiments may integrate multiple processors 401 onto a single die and/or into a single package. Yet other embodiments may integrate multiple processors 401 with multiple local cache memories 403 with a second level cache memory 405 into a single package 410 with a front side bus 407 to communicate to a memory/bus controller 411. The memory/bus controller 411 may accept accesses from the processor(s) 401 and direct them to either the internal memory 413 or to the various input/output (I/O) busses 409. Some embodiments of the computer system 400 may include multiple processor packages 410 sharing the front-side bus 407 to the memory/bus controller. Other embodiments may have multiple processor packages 410 with independent front-side bus connections to the memory/bus controller. The memory bus controller may communicate with the internal memory 413 using a memory bus 409.

The internal memory 413 may include one or more of random access memory (RAM) devices such as synchronous dynamic random access memories (SDRAM), double data rate (DDR) memories, or other volatile random access memories. The internal memory 413 may also include non-volatile memories such as electrically erasable/programmable read-only memory (EEPROM), NAND flash memory, NOR flash memory, programmable read-only memory (PROM), read-only memory (ROM), battery backed-up RAM, or other non-volatile memories. In some embodiments, the computer system 400 may also include $3^{rd}$ level cache memory or a combination of these or other like types of circuitry configured to store information in a retrievable format. In some implementations the internal memory 413 may be configured as part of the processor 401, or alternatively, may be configured separate from it but within the same package 410. The processor 401 may be able to access internal memory 413 via a different bus or control lines than is used to access the other components of computer system 400.

The computer system 400 may also include, or have access to, one or more hard drives 415 (or other types of storage memory) and optical disk drives 417. Hard drives 415 and the optical disks for optical disk drives 417 are examples of machine readable (also called computer readable) mediums suitable for storing the final or interim results of the various embodiments. The optical disk drives 417 may include a combination of several disc drives of various formats that can read and/or write to removable storage media (e.g., CD-R, CD-RW, DVD, DVD-R, DVD-W, DVD-RW, HD-DVD, Blu-Ray, and the like). Other forms or computer readable media that may be included in some embodiments of computer system 400 include, but are not limited to, floppy disk drives, 9-track tape drives, tape cartridge drives, solid-state drives, cassette tape recorders, paper tape readers, bubble memory devices, magnetic strip readers, punch card readers or any other type or computer useable or machine readable storage medium.

The computer system 400 may either include the hard drives 415 and optical disk drives 417 as an integral part of the computer system 400 (e.g., within the same cabinet or enclosure and/or using the same power supply), as connected peripherals, or may access the hard drives 415 and optical disk drives 417 over a network, or a combination of these. The hard drive 415 often includes a rotating magnetic medium configured for the storage and retrieval of data, computer programs or other information. In some embodiments, the hard drive 415 may be a solid state drive using semiconductor memories. In other embodiments, some other type of computer useable medium may be used. The hard drive 415 need not necessarily be contained within the computer system 400. For example, in some embodiments the hard drive 415 may be server storage space within a network that is accessible to the computer system 400 for the storage and retrieval of data, computer programs or other information. In some instances the computer system 400 may use storage space at a server storage farm, or like type of storage facility, that is accessible by the Internet 429 or other communications lines. The hard drive 415 is often used to store the software, instructions and programs executed by the computer system 400, including for example, all or parts of the computer application program for carrying out activities of the various embodiments.

The communication link 409 may be used to access the contents of the hard drives 415 and optical disk drives 417. The communication links 409 may be point-to-point links such as Serial Advanced Technology Attachment (SATA) or a bus type connection such as Parallel Advanced Technology Attachment (PATA) or Small Computer System Interface (SCSI), a daisy chained topology such as IEEE-1394, a link supporting various topologies such as Fibre Channel, or any other computer communication protocol, standard or proprietary, that may be used for communication to computer readable medium. The memory/bus controller may also provide other I/O communication links 409. In some embodiments, the links 409 may be a shared bus architecture such as peripheral component interface (PCI), microchannel, industry standard architecture (ISA) bus, extended industry standard architecture (EISA) bus, VERSAmoduleEurocard (VME) bus, or any other shared computer bus. In other embodiments, the links 409 may be a point-to-point link such as PCI-Express, HyperTransport, or any other point-to-point I/O link. Various I/O devices may be configured as a part of the computer system 400.

In many embodiments, a network interface 419 may be included to allow the computer system 400 to connect to a network 427 or 431. Either of the networks 427 and 431 may operate in accordance with standards for an IEEE 802.3 ethernet network, an IEEE 802.11 Wi-Fi wireless network, or any other type of computer network including, but not limited to, LANs, WAN, personal area networks (PAN), wired networks, radio frequency networks, powerline networks, and optical networks. A network gateway 433 or router, which may be a separate component from the computer system 400 or may be included as an integral part of the computer system 400, may be connected to the networks 427 and/or 431 to allow the computer system 400 to communicate with the Internet 429 over an internet connection such as an asymmetric digital subscriber line (ADSL), data over cable service interface specification (DOCSIS) link, T1 or other internet connection mechanism. In other embodiments, the computer system 400 may have a direct connection to the Internet 429. The computer system 400 may be connected to one or more other computers such as desktop computer 441 or laptop computer 443 via the Internet 429, an intranet 431, and/or a wireless node 445. In some embodiments, an expansion slot 421 may be included to allow a user to add additional functionality to the computer system 400.

The computer system 400 may include an I/O controller 423 providing access to external communication interfaces such as universal serial bus (USB) connections, serial ports such as RS-232, parallel ports, audio in and audio out connections, the high performance serial bus IEEE-1394 and/or other communication links. These connections may also have separate circuitry in some embodiments, or may be connected through a bridge to another computer communication link provided by the I/O controller 423. A graphics controller 425 may also be provided to allow applications running on the processor 401 to display information to a user. The graphics controller 425 may output video through a video port that may utilize a standard or proprietary format such as an analog video graphic array (VGA) connection, a digital video interface (DVI), a digital high definition multimedia interface (HDMI) connection, or any other video connection. The video connection may connect to display 437 to present the video information to the user.

The display 437 may be any of several types of displays or computer monitors, including a liquid crystal display (LCD), a cathode ray tube (CRT) monitor, on organic light emitting diode (OLED) array, or other type of display suitable for displaying information for the user. The display 437 may include one or more light emitting diode (LED) indicator lights, or other such display devices. Typically, the computer system 400 includes one or more user input/output (I/O) devices such as a keyboard and mouse 439, and/or other means of controlling the cursor represented including but not limited to a touchscreen, touchpad, joystick, trackball, tablet, or other device. The user I/O devices 435 may connect to the computer system 400 using USB interfaces or other connections such as RS-232, PS/2 connector or other interfaces. Various embodiments include input devices configured to accept an input from a user and/or provide an output to a user. For example, some embodiments may include a webcam (e.g., connect via USB), a microphone (e.g., connected to an audio input connection), and/or speakers (e.g., connected to an audio output connection). The computer system 400 typically has a keyboard and mouse 439, a monitor 437, and may be configured to include speakers, microphone, and a webcam. These input/output devices may be used in various combinations, or separately, as means for presenting information to the user and/or receiving information and other inputs from a user to be used in carrying out various programs and calculations. Speech recognition software may be used in conjunction with the microphone to receive and interpret user speech commands.

The processor 401 may be embodied as a microprocessor, microcontroller, DSP, RISC processor, two or more parallel processors, or any other type of processing unit that one of ordinary skill would recognize as being capable of performing or controlling the functions, steps, activities and methods described herein. A processing unit in accordance with at least one of the various embodiments can operate computer software programs stored (embodied) on computer-readable medium such those compatible with the disk drives 415, the optical disk drive 417 or any other type of hard disk drive, floppy disk, flash memory, ram, or other computer readable medium as recognized by those of ordinary skill in the art.

As will be appreciated by those of ordinary skill in the art, aspects of the various embodiments may be embodied as a system, method or computer program product. Accordingly, aspects of the various embodiments may take the form of an entirely hardware embodiment, an entirely software embodiment (including firmware, resident software, micro-code, or the like) or an embodiment combining software and hardware aspects that may all generally be referred to herein as a "circuit," "module," "logic" or "system." Furthermore, aspects of the various embodiments may take the form of a computer program product embodied in one or more computer readable medium(s) having computer readable program code stored thereon.

Any combination of one or more computer readable medium(s) may be utilized. The computer readable medium is typically a non-transitory computer readable storage medium. Such a non-transitory computer readable storage medium may be embodied as, for example, an electronic, magnetic, optical, electromagnetic, infrared, or semiconductor system, apparatus, or device, or other like storage devices known to those of ordinary skill in the art, or any suitable combination of the foregoing. Examples of such computer readable storage medium include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations and aspects of the various embodiments may be written in any combination of one or more programming languages, including an object oriented programming language such as Java, Smalltalk, C++, or the like, and conventional procedural programming languages, such as the "C" programming language or similar programming languages. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the various embodiments are described with reference to flowchart illustrations and/or block diagrams of methods, apparatus, systems, and computer program products according to various embodiments disclosed herein. It will be understood that blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, a programmable data processing apparatus, or other such devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products according to the various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur in an order other than that depicted in the figures. For example, two blocks shown in succession may, in fact, be executed substantially concurrently, or the blocks and activities of the figures may sometimes be executed in reverse order or in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including" used in this specification specify the presence of stated features, integers, steps, operations, elements, and/or components, but do not preclude the presence or addition of one or more other features, integers, steps, operations, elements, components, and/or groups thereof. The term "obtaining", as used herein and in the claims, may mean either retrieving from a computer readable storage medium, receiving from another computer program, receiving from a user, calculating based on other input, or any other means of obtaining a datum or set of data. The term "plurality", as used herein and in the claims, means two or more of a named element. It should not, however, be interpreted to necessarily refer to every instance of the named element in the entire device. Particularly, if there is a reference to "each" element of a "plurality" of elements. There may be additional elements in the entire device that are not be included in the "plurality" and are not, therefore, referred to by "each."

The corresponding structures, materials, acts, and equivalents of all means or step plus function elements in the claims below are intended to include any structure, material, or act for performing the function in combination with other claimed elements as specifically claimed. The description of the various embodiments has been presented for purposes of illustration and description, but is not intended to be exhaustive or limited to the form disclosed. Many modifications and variations will be apparent to those of ordinary skill in the art without departing from the scope and gist of the various embodiments. The various embodiments included herein were chosen and described in order to best explain the principles of operation and the practical application, and to enable others of ordinary skill in the art to understand the embodiments with various modifications as are suited to the particular use contemplated.

What is claimed is:

1. A method of initiating a break in program code running in process space of a local processor, the method being implemented with a computer system having at least one processor coupled with memory-stored executable instructions, which when executed by the at least one processor, perform the method steps, comprising:
   running the program code in the process space of the processor;
   providing access to remote hardware comprising a remote processor coupled to one or more remote hardware memory segments, wherein the program code running in the process space of the local processor uses a defined service interface to access to the remote hardware;
   accessing the remote processor coupled to the or more remote hardware memory segments with the program code, wherein the program code includes a predefined break event for said remote processor coupled to the one or more remote hardware memory segments;
   providing a shadow mechanism in said process space of the local processor with one or more shadow segments respectively corresponding to each of one or more remote hardware memory segments to be accessed by the program code, wherein a corresponding copy of data in the one or more remote hardware memory segments is maintained by the shadow mechanism in said process space of the local processor;
   monitoring the shadow mechanism for the break event, wherein the monitoring is performed by the local processor executing the program code;
   detecting occurrence of a break event indicated in said one or more shadow segments corresponding to an occurrence of the break event in the one or more remote hardware memory segments; and
   halting execution of the program code in response to the detecting of the break event as indicated in said one or more shadow segments.

2. The method of claim 1, further comprising:
   storing an indication of the one or more remote hardware memory segments accessed by the program code;

initiating execution of said program code running in the process space; and wherein the local processor and the memory are disposed within a computer cabinet and the remote processor and the one or more remote hardware memory segments are located outside said computer cabinet; and wherein the local processor is connected to the remote processor via a path comprising a network.

3. The method of claim 1, further comprising:
providing a hardware access layer in said process space configured to provide access to the remote hardware via the defined service interface;
wherein said program code accesses the one or more remote hardware memory segments via the defined service interface.

4. The method of claim 1, further comprising:
receiving an input selecting the program code to be analyzed.

5. The method of claim 1, further comprising:
receiving an input defining at least one break event including said break event;
wherein the break event is a change in one of said one or more remote hardware memory segments as indicated in one of said one or more shadow segments.

6. The method of claim 5, wherein said change resulting in the break event is a program code change in said one of the one or more remote hardware memory segments caused by the program code as indicated in said one of the or more shadow segments.

7. The method of claim 5, wherein said change resulting in the break event is an intrinsic change in said one of the one or more remote hardware memory segment as indicated in said one of the one or more shadow segments.

8. The method of claim 5, wherein the break event is a change in one of said one or more remote hardware memory segments not caused by interaction with the program code.

9. A computer program product for initiating a break in program code running in process space of a local processor, the computer program product comprising a non-transitory computer readable storage medium having computer instructions embodied therewith that, upon being executed on a computer, cause the computer to perform steps comprising:
running the program code in the process space of the local processor;
providing access to remote hardware comprising a remote processor coupled to one or more remote hardware memory segments, wherein the program code running in the process space of the local processor uses a defined service interface to access to the remote hardware;
accessing the remote processor coupled to the one or more remote hardware memory segments with the program code, wherein the program code includes a predefined break event for said remote processor coupled to the one or more remote hardware memory segments;
providing a shadow mechanism in said process space of the local processor with one or more shadow segments respectively corresponding to each of the one or more remote hardware memory segments to be accessed by the program code, wherein a corresponding copy of data in the one or more remote hardware memory segments is maintained by the shadow mechanism in said process space of the local processor;
monitoring the shadow mechanism for the break event, wherein the monitoring is performed by the local processor executing the program code;
detecting occurrence of a break event indicated in said one or more shadow segments corresponding to an occurrence of the break event in the one or more hardware memory segments; and
halting execution of the program code in response to the detecting of the break event as indicated in said one or more shadow segments.

10. The computer program product of claim 9, wherein the steps further comprise:
storing an indication of the one or more remote hardware memory segments accessed by the program code;
initiating execution of said program code running in the process space; and
wherein the local processor and the memory are disposed within a computer cabinet and the remote processor and the one or more remote hardware memory segments are located outside said computer cabinet; and
wherein the local processor is connected to the remote processor via a path comprising a network.

11. The computer program product of claim 9, wherein the steps further comprise:
providing a hardware access layer in said process space configured to provide access to the remote hardware via the defined service interlace;
wherein said program code accesses the one or more remote hardware memory segments the defined service interface.

12. The computer program product of claim 9, wherein the steps further comprise:
receiving an input selecting the program code to be analyzed.

13. The computer program product of claim 9, wherein the steps further comprise:
receiving an input defining at least one break event including said break event;
wherein the break event is a change in one of said one or more remote hardware memory segments as indicated in one of said one or more shadow segments.

14. The computer program product of claim 13, wherein said change resulting in the break event is a program code change in said one of the one or more remote hardware memory segments caused by the program code as indicated in said one of the one or more shadow segments.

15. The computer program product of claim 13, wherein said change resulting in the break event is an intrinsic change in said one of the one or more remote hardware memory segments as indicated in said one of the one or more shadow segments.

16. The computer program product of claim 13, wherein the break event is a change in one of said one or more remote hardware memory segments not caused by interaction with the program code.

17. A computer system configured to initiate a break in program code, the system comprising:
a defined service interface configured to provide access to remote hardware comprising a remote processor coupled to one or more remote hardware memory segments;
a local processor configured to run said program code in a process space, wherein the program code running in the process space of the local processor uses the defined service interface to access to the remote hardware;
a port for connecting to said remote processor coupled to the one or more remote hardware memory segments accessed by the program code; and a memory configured to contain a shadow mechanism with one or more shadow segments respectively corresponding to said one or more remote hardware memory segments, wherein a corresponding copy of data in the one or more remote hardware memory segments is maintained by the shadow mechanism in said process space of the local processor;

wherein the program code includes a predefined break event for said remote processor coupled to the one or more remote hardware memory segments; and wherein said local processor is configured to monitor the shadow mechanism for the break event and halt execution of the program, code in response to the detecting of the break event as indicated in said one or more shadow segments corresponding to an occurrence of the break event in the one or more remote hardware memory segments.

18. The computer system of claim 17, wherein the memory is further configured to store an indication of the one or more remote hardware memory segments accessed by the program code, and the local processor is further configured to initiate execution of said program code running in the process space;

wherein the local processor and the memory are disposed within a computer cabinet and the remote processor and the one or more remote hardware memory segments are located outside said computer cabinet; and wherein the local processor is connected to the remote processor via a path comprising a network.

19. The computer system of claim 18, further comprising:
a hardware access layer configured in said process space to provide access to the remote hardware via the defined service interface;

wherein said program code accesses the one or more remote hardware memory segments via the defined service interface.

20. The computer system of claim 18, further comprising:
means for receiving an input selecting the program code to be analyzed; and means for receiving an input defining at least one break event including said break event;

wherein the break event is a change in one of said one or more remote hardware memory segments as indicated in one of said one or more shadow segments.

21. The computer system of claim 20, wherein said change resulting in the break event is a program code change in said one of the one or more remote hardware memory segments caused by the program code as indicated in said one of the one or more shadow segments.

22. The computer system of claim 20, wherein said change resulting in the break event is an intrinsic change in said one of the one or more remote hardware memory segments as indicated in said one of the one or more shadow segments.

* * * * *